United States Patent
Qiu et al.

(10) Patent No.: US 6,640,318 B1
(45) Date of Patent: Oct. 28, 2003

(54) CONTINUITY TESTING IN COMMUNICATION NETWORKS

(75) Inventors: Chaoxin Charles Qiu, Olathe, KS (US); Shannon P. Silvus, Penfield, NY (US); Michael J. Gettles, Olathe, KS (US); William Douskalis, Centreville, VA (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 09/523,813

(22) Filed: Mar. 13, 2000

(51) Int. Cl.[7] .................................................. G06F 11/00

(52) U.S. Cl. ........................ 714/43; 714/714; 379/22.01

(58) Field of Search ................................ 714/43, 4, 18, 714/55, 749, 714; 379/22.01, 22.02, 22.03; 370/525, 526

(56) References Cited

U.S. PATENT DOCUMENTS

| | | | |
|---|---|---|---|
| 5,438,570 A | | 8/1995 | Karras et al. |
| 6,023,474 A | * | 2/2000 | Gardner et al. ............. 370/467 |
| 6,333,931 B1 | * | 12/2001 | LaPier et al. ............... 370/385 |

FOREIGN PATENT DOCUMENTS

| | | | |
|---|---|---|---|
| JP | 363263961 A | * 10/1988 | ................. 379/279 |
| WO | WO 98/23053 | 5/1998 | |
| WO | WO 99/28827 | 6/1999 | |

* cited by examiner

*Primary Examiner*—Scott Baderman (57) ABSTRACT

A communication hub for providing continuity testing in communication networks. The communication hub comprises a processor coupled to an interface. The processor is configured to process a continuity test instruction to generate a request for continuity acknowledgment message. The interface is configured to receive the continuity test instruction and transmit the request for continuity acknowledgment message.

36 Claims, 11 Drawing Sheets

CONTINUITY TESTING IN COMMUNICATION NETWORKS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to communication networks, and specifically, to a method and system for providing continuity testing in communication networks.

2. Description of the Prior Art

The development of advanced communication networks has taken on critical importance with the dramatic rise in consumer demand for higher quality services. Continuity testing in communication networks is one method of ensuring the quality of services. A continuity test ensures bearer channel connectivity prior to call completion. The continuity test is generally performed on a pre-determined percentage of calls to verify bearer channel connectivity between a pair of switches.

Figure 1:
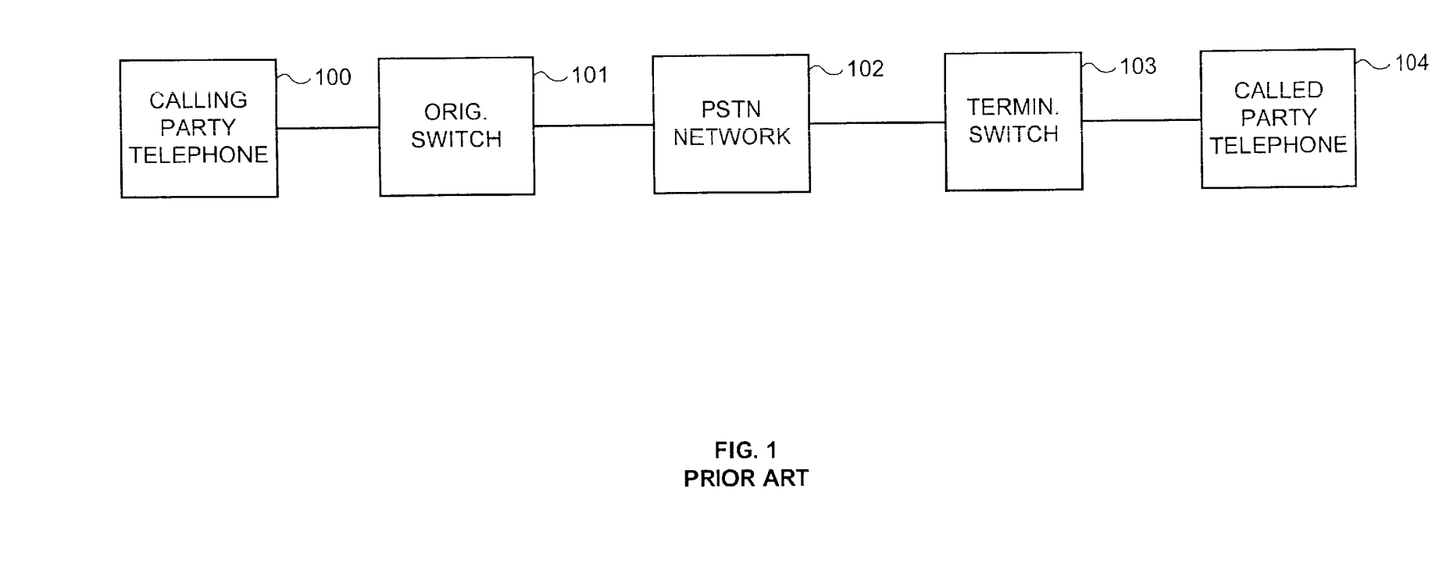
FIG. 1 illustrates an example of a prior art communication network.

FIG. 1 illustrates an example of a continuity test in a public switched telephone network (PSTN) using signaling system 7 (SS7). On FIG. 1 the calling party removes the receiver from the calling party's telephone 100. The originating switch 101 detects the off-hook and provides a dial tone to telephone 100. Responsive to receiving the dial tone, the user enters the digits for a call destination. The originating switch 101 processes the entered digits and provides an initial address message (IAM) to the network 102. The IAM message includes a continuity test flag that indicates to the network 102 that a continuity test will be performed on the bearer channel between the network 102 and the originating switch 101. The originating switch 101 then sends a test tone over the bearer channel to the network 102. Responsive to sending the test tone, the originating switch 101 starts a timer. The network 102 loops the test tone back to the originating switch 101. If the test tone is received back in the originating switch 101 before the timer times-out, the continuity test is successful and the originating switch 101 sends a continuity message to the network 102. The continuity message confirms the continuity test is complete and successful. If the test tone is not received back in the originating switch 101 before the timer times-out, the continuity test is failed and the call is cleared. Responsive to a successful continuity test, the network 102 provides an IAM message to the terminating switch 103 and reserves a call connection between the originating switch 101 and the terminating switch 103. The terminating switch 103 sends an address complete message (ACM) to the network 102 and the call is completed between telephones 100 and 104 in the conventional fashion.

Unfortunately, packet-networks do not effectively support continuity testing. These networks typically require installation of communication hubs in the customer premises. The communication hubs are controlled by an out-of-band call agent that does not have knowledge of bearer path connectivity when call setup messages are received from the communication hubs.

SUMMARY OF THE INVENTION

The present invention advances the art by providing a communication hub that performs continuity testing in communication networks. Advantageously, the present communication hub controls and performs continuity testing in packet networks and other networks connected to the packet network. Also advantageously, service assurance is provided before call completion and early detection of network failures is realized.

In one embodiment of the invention, the communication hub comprises a processor coupled to an interface. The processor is configured to process a continuity test instruction to generate a request for continuity acknowledgment message. The interface is configured to receive the continuity test instruction and transmit the request for continuity acknowledgment message. If a continuity acknowledgment message is received in the communication hub responsive to the request for continuity acknowledgment message, the continuity test is passed. If the continuity acknowledgment message is not received in response to the request for continuity acknowledgment message, the continuity test is failed.

In another embodiment of the present invention the communication hub is comprised of an interface coupled to a processor and a tone generator. The processor is configured to process a continuity test instruction to generate a request for continuity acknowledgment message. In some examples of the invention, the processor is also configured to process a continuity test tone instruction to direct the tone generator to provide continuity test tones to another communication network. The tone generator is configured to generate the continuity test tones under control of the processor. The interface is configured to receive the continuity test instruction and the continuity test tone instruction and transmit the request for continuity acknowledgment message and the continuity test tones for the processor.

In the context of the present invention the first, second, third, fourth, etc. connotations used to reference the messages, the calls, and the devices are used for the purpose of differentiating between different messages, different calls, and different devices and are not used to indicate a message sequence, call sequence or processing sequence. Also in the context of the present invention, an on-network call session is defined as a call session between two devices connected to the same communication network. An off-network to on-network call session and an on-network to off-network call session are defined as an incoming call session or an outgoing call session, respectively, between two devices connected to different communication networks. For example, an incoming call session or an outgoing call session between a call device connected to a packet network and a call device connected to the PSTN. In-band is defined as using the bearer portion of a communication path, for example, over the bearer channel in an asynchronous transfer mode (ATM) connection. Those skilled in the art will appreciate that in some environments, such as an Internet Protocol (IP) environment, in-band could simply be a pair of addresses, such as the address of the originating device and the address of the terminating device.

DETAILED DESCRIPTION OF THE PREFERRED EMBODIMENT

Figure 2:
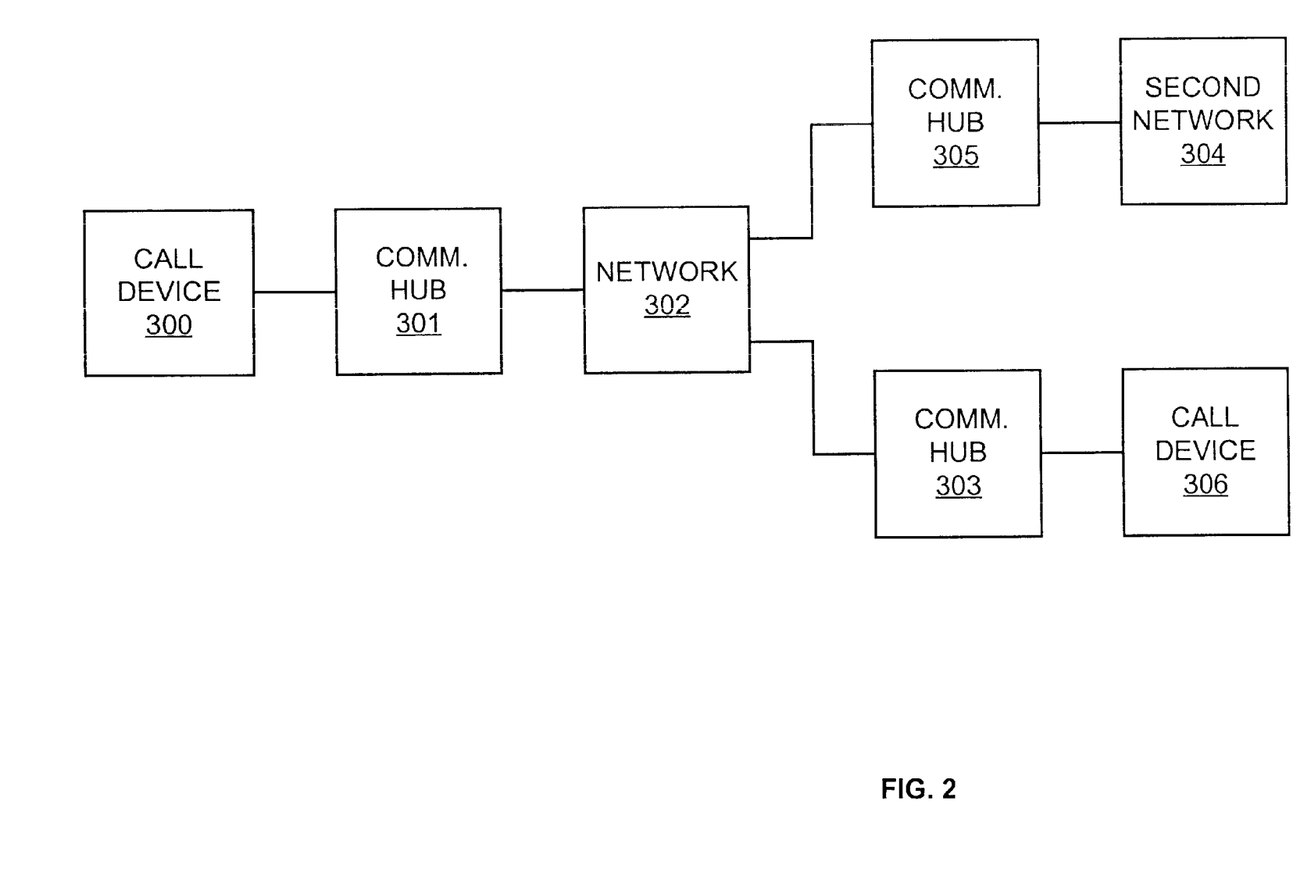
FIG. 2 illustrates an example of a network architecture according to the present invention.

FIG. 2 illustrates a network architecture according to the present invention. FIG. 2 depicts call devices 300 and 306, communication hubs 301, 303, and 305, communication network 302 and second communication network 304. Communication hub 301 is connected to call device 300 and communication network 302. Communication network 302 is connected to communication hubs 303 and 305. Communication hub 303 is connected to call device 306 and second communication network 304 is connected to communication hub 305.

Call devices 300 and 306 could be conventional call devices that use digital and analog telephony format. Some examples of call devices 300 and 306, are devices configured to provide voice, data, and video communications. Communication network 302 and second communication network 304 could be different communication networks. In some examples of the present invention, communication network 302 is a packet network and second communication network 304 could be any other network including without limitation, a wireless network, a packet network, an internet, or a PSTN. Those skilled in the art will appreciate the communication networks 302 and 304 would include various conventional components not shown on FIG. 3 for clarity.

Communication hub 301 could be any communication device capable of receiving a continuity test instruction and process the continuity test instruction to provide a request for continuity acknowledgment message. Communication hub 303 could be any communication device capable of receiving and processing the request for continuity acknowledgment message to generate and transmit a continuity acknowledgment message. If communication hub 301 receives the continuity acknowledgment message responsive to its request, the continuity test is successful. If communication hub 301 does not receive the continuity acknowledgment message responsive to its request, the continuity test is failed. Some examples of communication hub 301 include without limitation, a residential communication hub, a private branch exchange (PBX), and a switch.

Communication hub 301 could also incorporate the features of communication hub 303 to receive a continuity test instruction and process the continuity test instruction to provide a request for continuity acknowledgment message. Similarly, communication hub 303 could incorporate the features of communication hub 301 to receive and process the request for continuity acknowledgment message to generate and transmit a continuity acknowledgment message.

Communication hub 305 could be any communication device capable of interfacing between communication network 302 and second communication network 304. Communication hub 305 could incorporate the features of communication hubs 301 and 303 to perform continuity testing in communication network 302. Communication hub 305 could also be configured to receive a continuity test tones instruction and process the continuity test tones instruction to provide continuity test tones to second communication network 304. If communication hub 305 receives an acknowledgment responsive to providing the continuity test tones, the continuity test is successful. In some examples of the present invention, the acknowledgment could be receipt of the continuity test tones through a conventional loopback method in second communication network 304. If communication hub 305 does not receive the acknowledgment responsive to providing the continuity test tones, the continuity test is failed. Some examples of communication hub 305 include without limitation, a network device such as a voice gateway, a PBX, and a switch.

Figure 3:
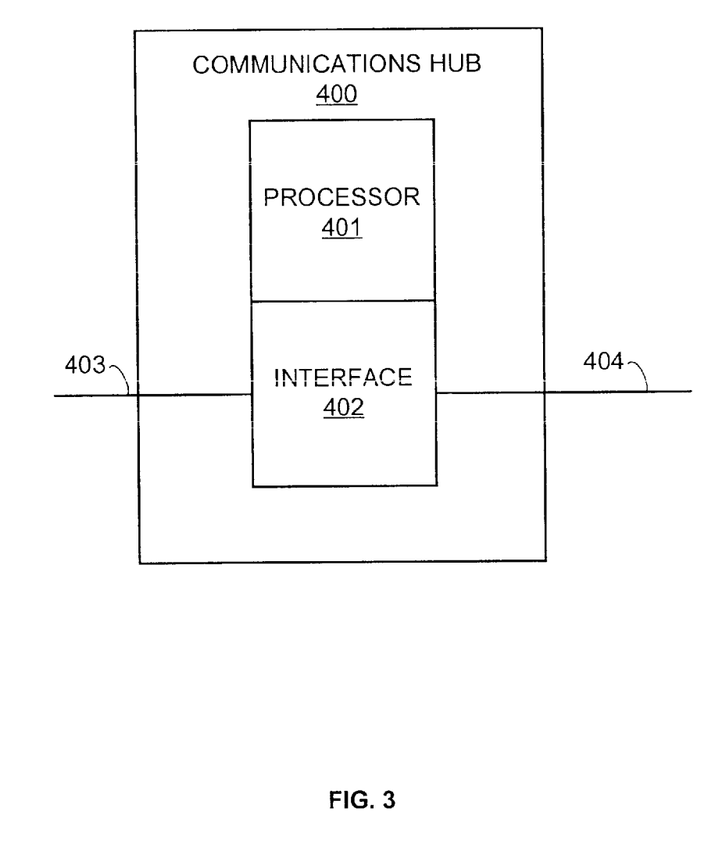
FIG. 3 illustrates an example of a communication hub according to the present invention.
Figure 4:
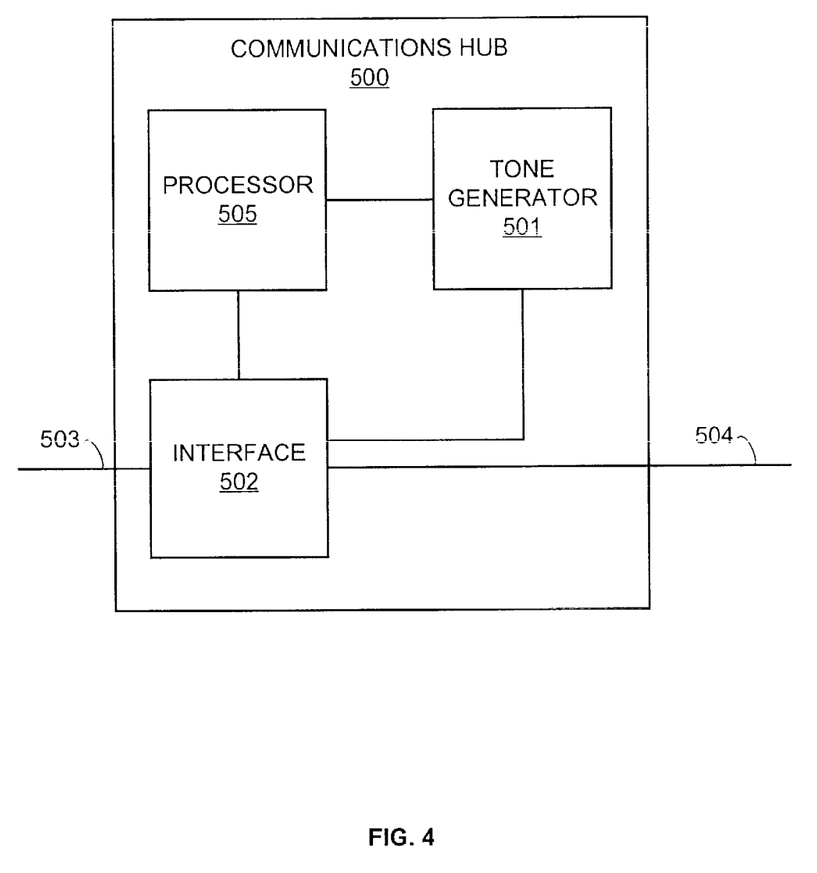
FIG. 4 illustrates another example of a communication hub according to the present invention.

The Communication Hub—FIGS. 3 and 4

FIG. 3 depicts an example of communication hubs 301, 303, and 305 according to the present invention, namely communication hub 400. Those skilled in the art will appreciate numerous variations that do not depart from the present invention. Those skilled in the art will also appreciate that various features described below could be combined with the above described embodiment to form multiple variations of the invention.

Communication hub 400 comprises processor 401 coupled to interface 402. Interface 402 is connected to communication paths 403 and 404. Communication paths 403 and 404 could be conventional communication paths. Those skilled in the art will appreciate that in some embodiments of the invention interface 402 could be a part of processor 401, such as where interface 402 is in the same processing circuitry or included on the same chip as processor 401. Those skilled in the art will also understand that communication hub 400 would include other conventional components not shown on FIG. 3 for clarity, depending on the type of device and its operation in a network environment.

Processor 401 could be any processor capable of processing various messages to conduct continuity testing of a bearer channel. For example, processor 401 could process a continuity test instruction to generate a request for continuity acknowledgment message for another communication device. If processor 401 receives the continuity acknowledgment message from the other communication device the continuity test is successful. If processor 401 does not receive the continuity acknowledgment message from the other communication device the continuity test is failed. Processor 401 could also receive and process a request for continuity acknowledgment message from another communication device to generate a continuity acknowledgment message for the other communication device. Advantageously, the request for continuity acknowledgment message and the continuity acknowledgment message are provided over the bearer channel, thus ensuring bearer channel connectivity prior to call completion.

Interface 402 could be any interface that receives messages for processor 401 and transmits messages for processor 401. Interface 402 could also be a voice interface that acts as a POTS interface or packet interface, supervises messages, channels voice communications, or resolves contention between voice lines or voice communication paths. Interface 402 could also be a data or video interface that manages data stream, video stream, performs asynchronous time division, or concentrates data and video lines or paths. One example of interface 402 includes without limitation an asynchronous transfer mode (ATM) interface capable of handling ATM messaging for processor 401 over communication path 404 and capable of handling analog signaling for processor 401 over communication path 403. Interface 402 could handle numerous such communication paths although only communication paths 403 and 404 are shown for clarity.

FIG. 4 depicts another example of communication hubs 301, 303, and 305 according to the present invention, namely communication hub 500. Those skilled in the art will appreciate numerous variations that do not depart from the present invention. Those skilled in the art will also appreciate that various features described below could be combined with the above described embodiment to form multiple variations of the invention.

Communication hub 500 is comprised of a processor 505, a tone generator 501, and an interface 502. Interface 502 is connected to processor 505, tone generator 501, and communication paths 503 and 504. Communication paths 503 and 504 could be conventional communication paths. Processor 505 is also connected to tone generator 501. Those skilled in the art will appreciate that in some embodiments of the invention tone generator 501 and interface 502 could be a part of processor 505, such as where tone generator 501 and interface 502 are in the same processing circuitry or included on the same chip as processor 505. Those skilled in the art will also understand that communication hub 500 would include other conventional components not shown on FIG. 5 for clarity, depending on the type of device and its operation in a network environment.

Processor 505 could be any processor capable of processing various messages to conduct continuity testing of a bearer channel. For example, processor 505 could process a continuity test instruction to generate a request for continuity acknowledgment message for another communication device. If processor 505 receives the continuity acknowledgment message from the other communication device the continuity test is successful. If processor 505 does not receive the continuity acknowledgment message from the other communication device the continuity test is failed. Processor 505 could also receive and process a request for continuity acknowledgment message from another communication device to generate and transmit a continuity acknowledgment message for the other communication device. Advantageously, the request for continuity acknowledgment message and the continuity acknowledgment message are provided over the bearer channel, thus ensuring bearer channel connectivity prior to call completion.

In another example, processor 505 is also configured to process a continuity test tone instruction to direct tone generator 501 to provide continuity test tones to another communication network. If processor 505 receives an acknowledgment message from the other communication network the continuity test is successful. If processor 505 does not receive the acknowledgment message from the other communication network the continuity test is failed. Advantageously, bearer channel connectivity in the local communication network and other communication networks is confirmed prior to call completion.

Interface 502 could be any interface that receives messages for processor 505 and transmits messages for processor 505. Interface 502 could also be a voice interface that acts as a POTS interface or packet interface, supervises messages, channels voice communications, or resolves contention between voice lines or voice communication paths. Interface 502 could also be a data or video interface that manages data stream, video stream, performs asynchronous time division, or concentrates data and video lines or paths. One example of interface 502 includes without limitation an asynchronous transfer mode (ATM) interface capable of handling ATM messaging for processor 505 over communication path 504 and capable of handling analog signaling for processor 505 over communication path 503. Interface 502 could handle numerous such communication paths although only communication paths 503 and 504 are shown for clarity.

Operation FIGS. 5–11

FIGS. 5–11 are message sequence charts illustrating various examples of the operation of a communication hub according to the present invention. It is anticipated, however, that various modifications to these examples will be readily apparent to those skilled in the art. The principles defined herein may also be applied to other embodiments without the use of inventive faculty. Thus, the present invention is not intended to be limited to the examples shown below but is to be accorded the widest scope consistent with the principles and novel features disclosed herein.

Figure 5:
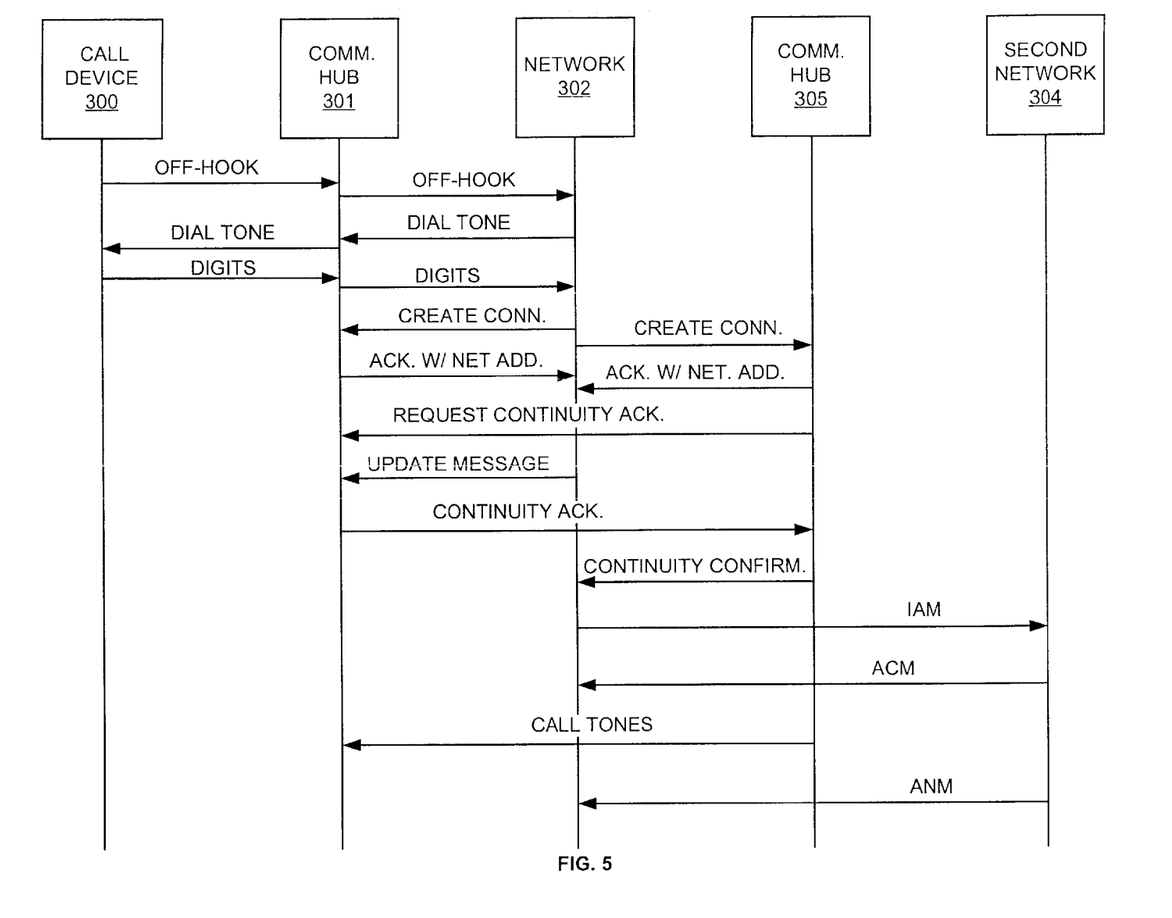
FIGS. 5 and 6 are a message sequence chart illustrating an example of an on-network to off-network call session according to the present invention.
Figure 6:
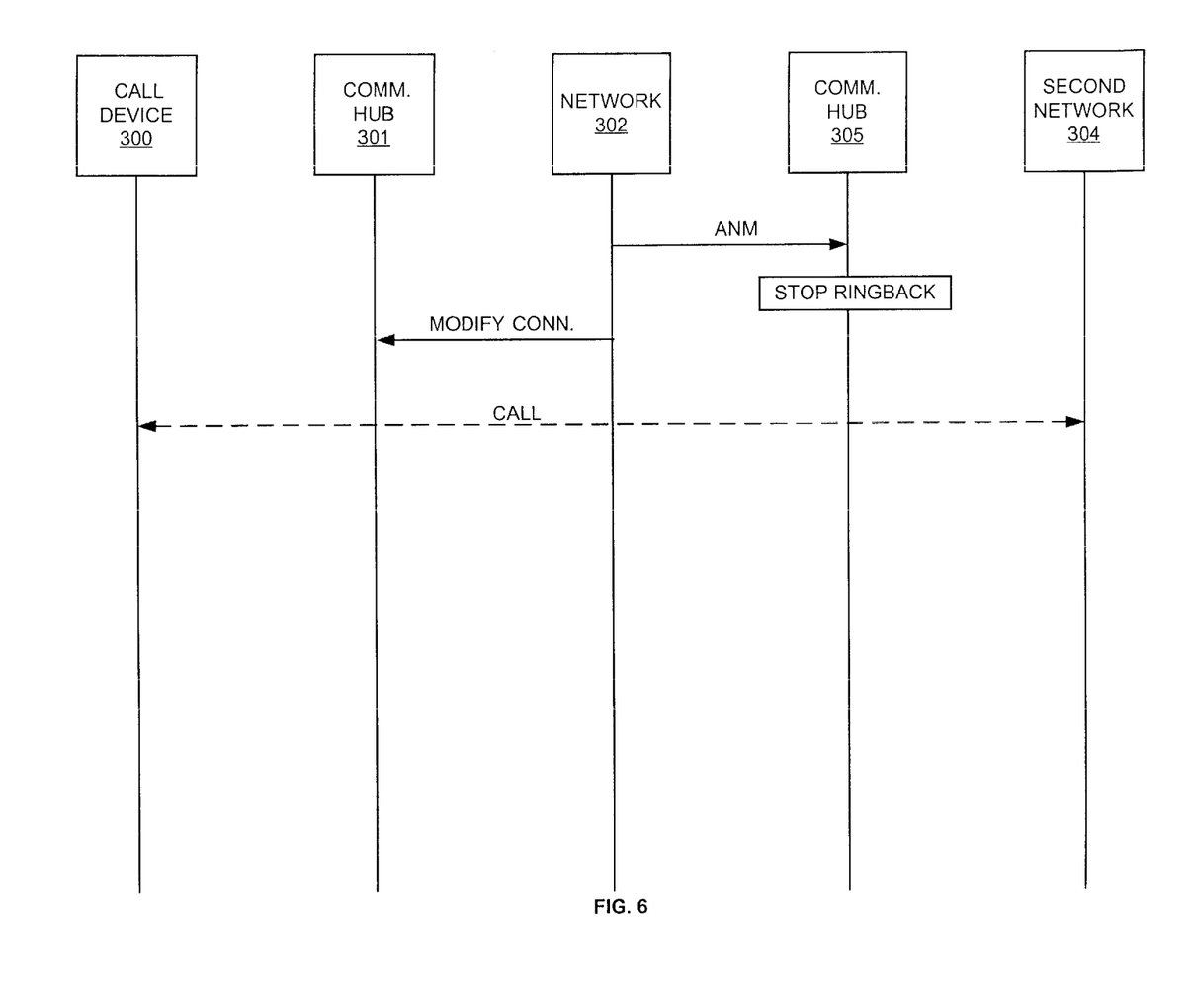

FIGS. 5 and 6 are a message sequence chart illustrating an example according to the present invention of a successful continuity test between communication hubs 301 and 305. In this example the call session is an on-network to off-network call session between communication hubs 301 and 305. On FIGS. 5 and 6 call device 300 goes off-hook and an off-hook event is detected in communication hub 301. Communication hub 301 provides an off-hook message to communication network 302. Responsive to receiving the off-hook message, communication network 302 provides a dial tone to call device 300 via communication hub 301. Caller entered digits are transmitted from call device 300 to communication network 302 via communication hub 301. Responsive to receiving the digits, communication network 302 provides a create connection message, to communication hub 301. The create connection message to communication hub 301 creates a half duplex bearer connection between communication network 302 and communication hub 301. Responsive to the connection setup, communication hub 301 provides an acknowledgment message to communication network 302. The acknowledgment message includes the network address of communication hub 301. Responsive to receiving the digits, communication network 302 also provides a create connection message to communication hub 305. The create connection message to communication hub 305 creates a full duplex bearer connection between communication network 302 and communication hub 305. Responsive to the connection setup, communication hub 305 provides an acknowledgment message to communication network 302. The acknowledgment message includes the network address of communication hub 305.

The create connection message to communication hub 305 includes the address of communication hub 301 and includes a continuity test instruction. Responsive to the continuity test instruction, communication hub 305 provides a request for continuity acknowledgment message to communication hub 301. Substantially concurrently, communication network 302 provides an update message to communication hub 301 that includes the address of communication hub 305. Responsive to the request for continuity acknowledgment message, communication hub 301 provides a continuity acknowledgment message to communication hub 305.

The request for continuity acknowledgment and the continuity acknowledgment message are provided in-band over the bearer channel by communication hubs 305 and 301. Advantageously, the completion of this messaging in-band ensures the bearer channel connectivity prior to call completion. Responsive to receiving the continuity acknowledgment message, communication hub 305 provides a continuity confirmation message to communication network 302 confirming the continuity acknowledgment message was received and provides call tones to call device 300. In this example the call tones are ringback call tones. Substantially concurrently to receiving the continuity confirmation message, communication network 302 provides an IAM message to second communication network 304. Responsive to processing the IAM message, second communication network 304 provides an ACM message to communication network 302. Responsive to the called device (not shown) going off-hook, second communication network 304 provides an answer (ANM) message to communication network 302.

Responsive to receiving the ANM message, communication network 302 provides an ANM message to communication hub 305. Responsive to receiving the ANM message, communication hub 305 stops providing the ringback tones to call device 300. Substantially concurrently, communication network 302 modifies the half duplex bearer connection between communication hub 301 and communication network 302 to a full duplex bearer connection to complete the call.

Those skilled in the art will appreciate that the continuity test could be performed on all calls. The continuity test could also be performed on a random unbiased basis for a certain percentage of calls based upon request from communication network 302. The request could be based on a frequency index established and adjusted based on the bearer network stability and availability. In some examples of the invention, the request for the continuity acknowledgment message and the continuity acknowledgment message could be retransmitted a pre-determined number of times at pre-determined intervals with duplicated received messages ignored.

Figure 7:
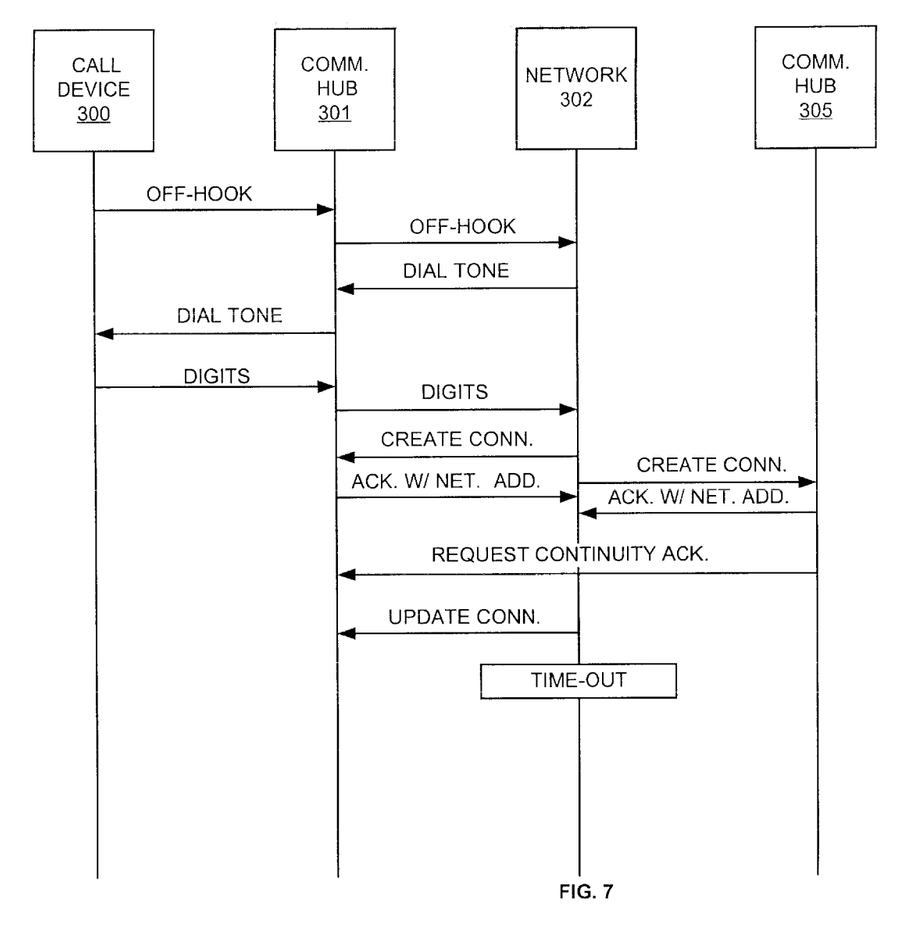
FIG. 7 is a message sequence chart illustrating an example of a failed on-network to off-network call session according to the present invention.

FIG. 7 is a message sequence chart illustrating an example according to the present invention of a failed continuity test between communication hubs 301 and 305. In this example the call session is an on-network to off-network call session between communication hubs 301 and 305. On FIG. 7 call device 300 goes off-hook and an off-hook event is detected in communication hub 301. Communication hub 301 provides an off-hook message to communication network 302. Responsive to receiving the off-hook message, communication network 302 provides a dial tone to call device 300 via communication hub 301. Caller entered digits are transmitted from call device 300 to communication network 302 via communication hub 301. Responsive to receiving the digits, communication network 302 provides a create connection message to communication hub 301. The create connection message to communication hub 301 creates a half duplex bearer connection between communication network 302 and communication hub 301. Responsive to the connection setup, communication hub 301 provides an acknowledgment message to communication network 302. The acknowledgment message includes the network address of communication hub 301. Responsive to receiving the digits, communication network 302 also provides a create connection message to communication hub 305. The create connection message to communication hub 305 creates a full duplex bearer connection between communication network 302 and communication hub 305. Responsive to the connection setup, communication hub 305 provides an acknowledgment message to communication network 302. The acknowledgment message includes the network address of communication hub 305. The create connection message to communication hub 305 includes the address of communication hub 301 and includes a continuity test instruction. Responsive to the continuity test instruction, communication hub 305 provides a request for continuity acknowledgment to communication hub 301. Substantially concurrently, communication network 302 provides an update message to communication hub 301 that includes the address of communication hub 305. Communication network 302 also starts an internal timer. In this case the bearer channel is inoperative and the continuity acknowledgment message is not received in communication hub 305. The internal timer in communication network 302 times-out before the continuity confirmation message from communication hub 305 is received. Responsive to the timer timing-out, communication network 302 clears the call. In another example, communication hub 305 could start an internal timer and send an error message to communication network 302 if the continuity acknowledgment message is not received prior to the timer-out of the timer. In this case communication network 302 clears the call responsive to receiving the error message from communication hub 305.

Figure 8:
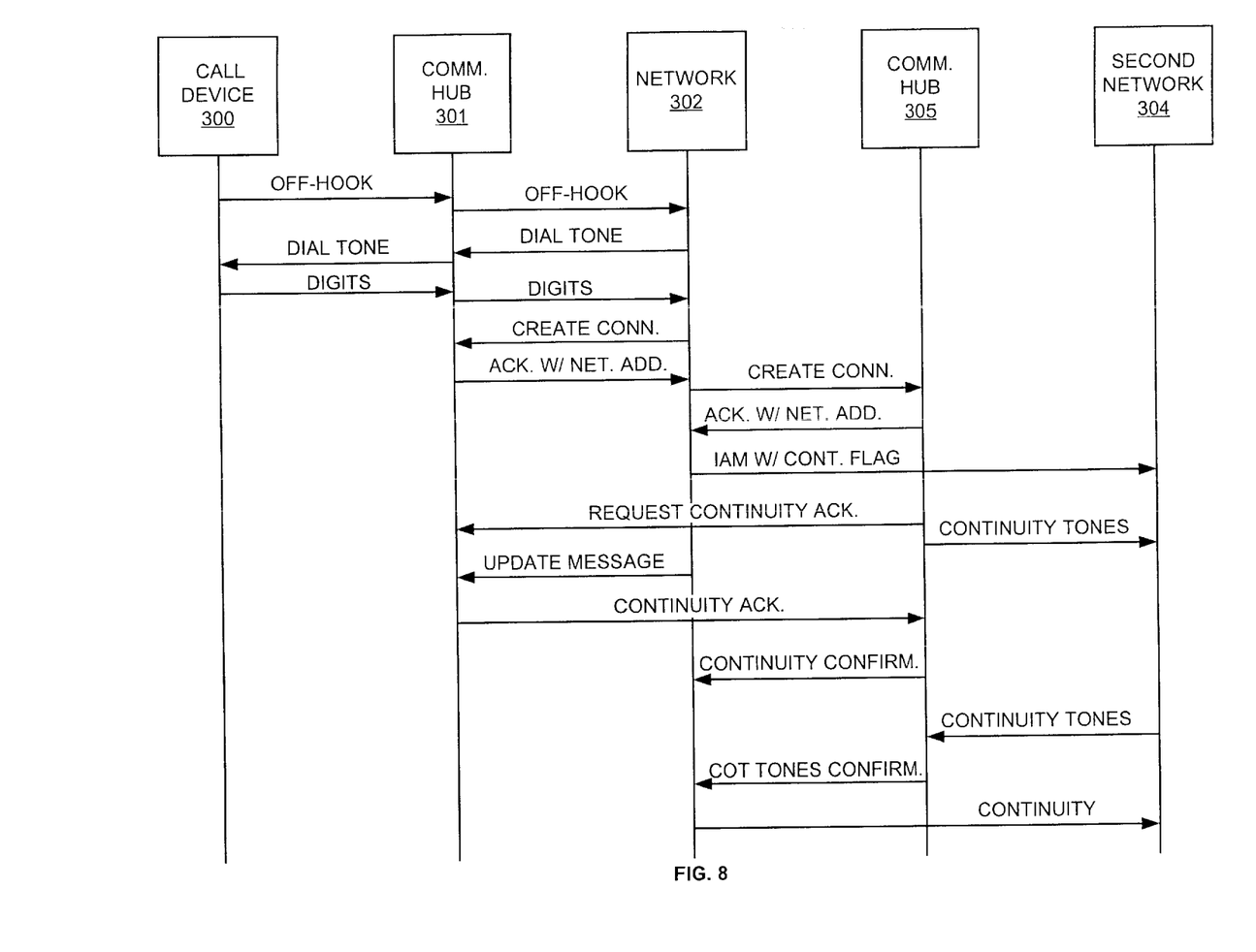
FIGS. 8 and 9 are a message sequence chart illustrating another example of an on-network to off-network call session according to the present invention.
Figure 9:
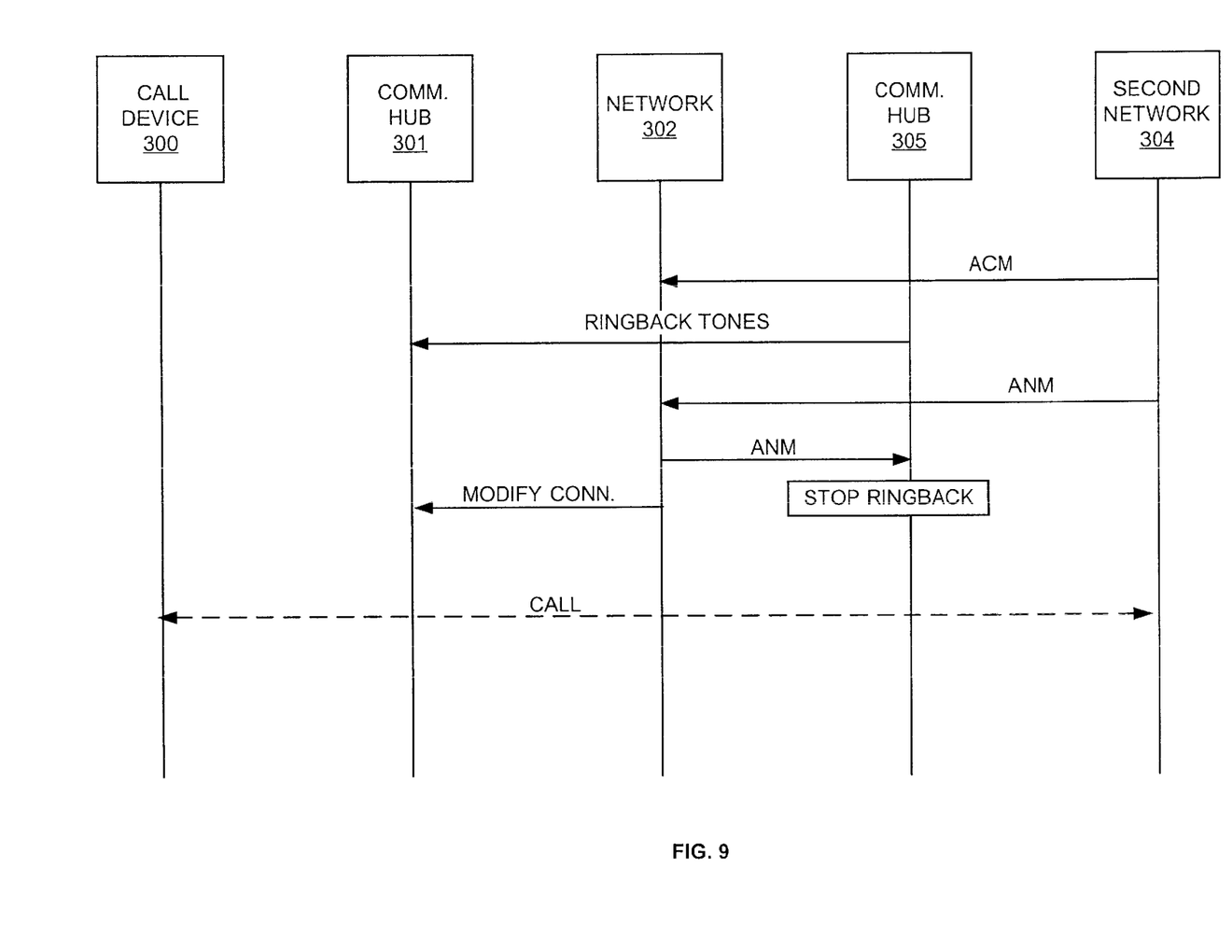

FIGS. 8 and 9 are a message sequence chart illustrating an example of a successful continuity test in communication network 302 and in second communication network 304. In this example the call session is an on-network to off-network call session between communication hubs 301 and 305. On FIGS. 8 and 9 call device 300 goes off-hook and an off-hook event is detected in communication hub 301. Communication hub 301 provides an off-hook message to communication network 302. Responsive to receiving the off-hook message, communication network 302 provides a dial tone to call device 300 via communication hub 301. Caller entered digits are transmitted from call device 300 to communication network 302 via communication hub 301. Responsive to receiving the digits, communication network 302 provides a create connection message to communication hub 301. The create connection message to communication hub 301 creates a half duplex bearer connection between communication network 302 and communication hub 301. Responsive to the connection setup, communication hub 301 provides an acknowledgment message to communication network 302. The acknowledgment message includes the network address of communication hub 301. Responsive to receiving the digits, communication network 302 also provides a create connection message to communication hub 305. The create connection message to communication hub 305 creates a full duplex bearer connection between network 302 and communication hub 305. Responsive to the connection setup, communication hub 305 provides an acknowledgment message to communication network 302. The acknowledgment message includes the network address of communication hub 305. The create connection message to communication hub 305 includes the address of communication hub 301, a continuity test instruction to perform the continuity test of the bearer channel in communication network 302, and a continuity test tone instruction to perform a continuity test of the bearer channel in second communication network 304. Communication network 302 also sends an IAM message to second communication network 304. The IAM message includes a continuity test flag to inform second communication network 304 that a continuity test will be performed before the call is completed.

Responsive to the continuity test instruction, communication hub 305 provides a request for continuity acknowledgment message to communication hub 301 and provides continuity test tones to second communication network 304. Substantially concurrently, communication network 302 provides an update message to communication hub 301 that includes the address of communication hub 305. Responsive to the request for continuity acknowledgment message, communication hub 301 provides a continuity acknowledgment message to communication hub 305.

Second communication network 304 process the continuity test tones by looping the tones back to communication hub 305. Responsive to receiving the continuity acknowledgment message, communication hub 305 provides a continuity confirmation message to communication network 302. The continuity confirmation message confirms receipt of the continuity acknowledgment message, and thus, the bearer channel connectivity in communication network 302. Responsive to receiving the continuity test tones back from second communication network 304, communication hub 305 provides a continuity test tone confirmation message to communication network 302. The continuity test tone confirmation message confirms receipt of the continuity tones, and thus, the bearer channel connectivity in second communication network 304. Responsive to receiving the continuity test tone confirmation message, communication network 302 provides a continuity test message to second communication network 304. The continuity test message confirms the continuity test is complete and successful.

Responsive to the continuity test message, second communication network 304 provides an ACM message to communication network 302. Responsive to receiving the continuity acknowledgment message and the continuity test tones communication hub 305 provides call tones to call device 300. In this case the call tones are ringback call tones. Responsive to receiving an ANM message from second communication network 304, communication network 302 provides an ANM message to communication hub 305. Responsive to receiving the ANM message, communication hub 305 stops providing the ringback tones to call device 300. Substantially concurrently, communication network 302 modifies the half duplex bearer connection between communication hub 301 and communication network 302 to a full duplex bearer connection to complete the call.

The continuity test in second communication network 304 could be performed on all calls. The continuity test in second communication network 304 could also be performed on a random unbiased basis for a certain percentage of calls based upon request from communication network 302. The request could be based on a frequency index established and adjusted based on the bearer network stability and availability. In some examples of the invention, the request continuity test message, the continuity acknowledgment message, and the continuity tones could be retransmitted a pre-determined number of times at pre-determined intervals with duplicated received messages ignored.

Figure 10:
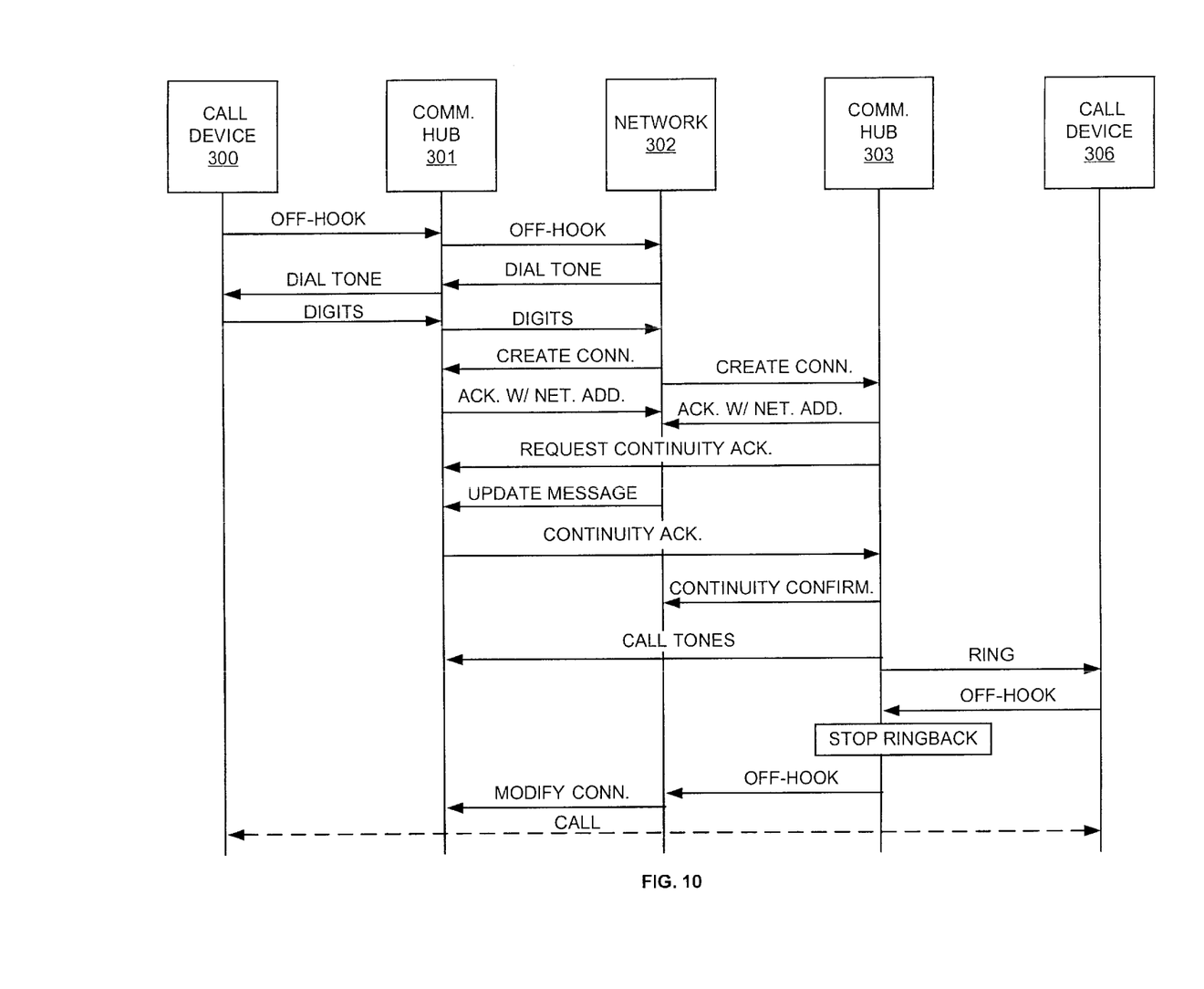
FIG. 10 is an example of an on-network call session according to the present invention.

FIG. 10 is a message sequence chart illustrating an example of a successful continuity test for an on-network call session between communication hubs 301 and 303 according to the present invention. On FIG. 10 call device 300 goes off-hook and an off-hook event is detected in communication hub 301. Communication hub 301 provides an off-hook message to communication network 302. Responsive to receiving the off-hook message, communication network 302 provides a dial tone to call device 300 via communication hub 301. Caller entered digits are transmitted from call device 300 to communication network 302 via communication hub 301. Responsive to receiving the digits, communication network 302 provides a create connection message to communication hub 301. The create connection message to communication hub 301 creates a half duplex bearer connection between communication network 302 and communication hub 301. Responsive to the connection setup, communication hub 301 provides an acknowledgment message to communication network 302. The acknowledgment message includes the network address of communication hub 301. Responsive to receiving the digits, communication network 302 also provides a create connection message to communication hub 303. The create connection message to communication hub 303 creates a full duplex bearer connection between network 302 and communication hub 303. Responsive to the connection setup, communication hub 303 provides an acknowledgment message to communication network 302. The acknowledgment message includes the network address of communication hub 303. The create connection message to communication hub 303 includes the address of communication hub 301 and includes a continuity test instruction. Responsive to the continuity test instruction, communication hub 303 provides a request for continuity acknowledgment to communication hub 301. Substantially concurrently, communication network 302 provides an update message to communication hub 301 that includes the address of communication hub 303. Responsive to the request for continuity acknowledgment message, communication hub 301 provides a continuity acknowledgment message to communication hub 303.

The request for continuity acknowledgment message and the continuity acknowledgment message are provided in-band over the bearer channel by communication hubs 303 and 301. Advantageously, the completion of this messaging in-band ensures the bearer channel connectivity prior to call completion. Responsive to receiving the continuity acknowledgment message, communication hub 303 provides a continuity confirmation message to communication network 302 confirming the continuity acknowledgment message was received and provides call tones to call device 300. In this case the call tones are ringback tones.

Responsive to receiving an off-hook signal from call device 306, communication hub 303 stops the ringback tones and provides an off-hook message to communication network 302. Responsive to receiving the off-hook message, communication network 302 modifies the half duplex bearer connection between communication hub 301 and communication network 302 to a full duplex bearer connection to complete the call.

The continuity test could be performed on all calls. The continuity test could also be performed on a random unbiased basis for a certain percentage of calls based upon request from communication network 302. The request could be based on a frequency index established and adjusted based on the bearer network stability and availability. In some examples of the invention, the request continuity test message and continuity acknowledgment message could be retransmitted a pre-determined number of times at pre-determined intervals with duplicated received messages ignored.

Figure 11:
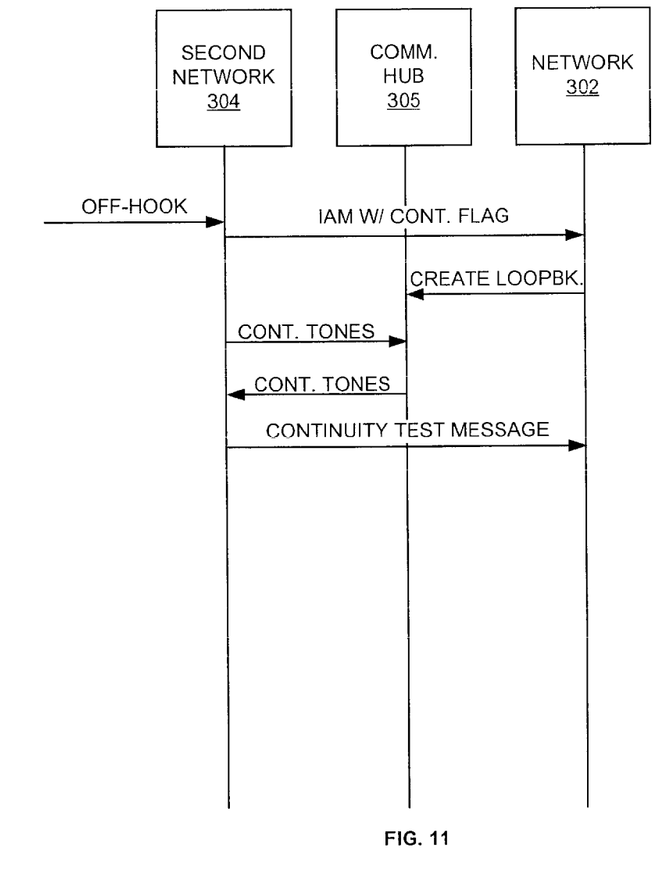
FIG. 11 is an example of an off-network to on-network call session according to the present invention.

FIG. 11 is a message sequence chart illustrating an example of a continuity test for an off-network to on-network call session according to the present invention. On FIG. 11 an off-hook signal is detected in second communication network 304 from a call device (not shown). Second communication network 304 processes the off-hook detection in a conventional manner to obtain the caller entered digits. Responsive to receiving the caller entered digits, second communication network 304 provides an IAM message to communication network 302 via communication hub 305. The IAM message includes a continuity test flag that indicates to communication network 302 that a continuity test is being performed in second communication network 304. Responsive to receiving the IAM message, communication network 302 provides a create loopback message to communication hub 305. The create loopback message provides communication hub 305 with loopback instructions for the continuity test tones. Second communication network 304 then provides continuity test tones, which are looped back to second communication network 304 by communication hub 305. Responsive to receiving the continuity test tones back, second communication network 304 provides a continuity test message to communication network 302 to indicate a successful test. Responsive to the continuity test message, communication network 302 could perform a continuity test of its bearer channel as described above or process the call in a conventional manner.

In another example according to the present invention, communication network 302 could provide a create loopback message to communication hub 301 responsive to receiving the IAM with continuity test flag. In this case the continuity test tones would be looped back by communication hub 301, thus eliminating the need for a separate continuity test in communication network 302.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art will appreciate variations of the above described embodiments that fall within the scope of the invention. As a result, the invention is not limited to the specific examples and illustrations discussed above, but only by the following claims and their equivalents.

We claim:

1. A communication hub configured to test for continuity on a channel of a packet network, the communication hub comprising:

a processor configured to process a continuity test instruction to generate a request for continuity acknowledgment message, and process a continuity acknowledgment message to generate a continuity confirmation message identifying continuity on the channel of the packet network if the continuity acknowledgment message is received; and an interface coupled to the processor and configured to transmit the request for continuity acknowledgment message over the channel in the packet network, receive the continuity test instruction, and receive the continuity acknowledgment message over the channel in the packet network.

2. The communication hub of claim 1 wherein the processor is configured to generate an error message if the continuity acknowledgment message is not received and wherein the interface is configured to transmit the error message.

3. The communication hub of claim 1 further comprising:

a tone generator configured to generate tones for the processor, wherein the processor is further configured to process the continuity acknowledgment message to direct the tone generator to generate call tones and wherein the interface is further configured to transmit the call tones.

4. The communication hub of claim 1 further comprising:

a tone generator configured to generate tones, wherein the processor is further configured to process a continuity test tones instruction to direct the tone generator to generate continuity test tones, and wherein the interface is further configured to transmit the continuity test tones over a bearer channel of a communication network.

5. The communication hub of claim 4 wherein the processor is further configured to process the continuity test tones to generate a continuity test tone confirmation message, and wherein the interface is further configured to receive the continuity test tones over the bearer channel of the communication network and transmit the continuity test tone confirmation message.

6. The communication hub of claim 1 wherein the processor is further configured to process another request for continuity acknowledgment message to generate another continuity acknowledgment message and wherein the interface is further configured to receive the other request for continuity acknowledgment message and transmit the other continuity acknowledgment message over the packet network.

7. The communication hub of claim 1 wherein the communication hub is a switch.

8. The communication hub of claim 1 wherein the communication hub is a residential communication hub.

9. The communication hub of claim 1 wherein the communication hub is a voice gateway.

10. A method of operating a communication hub to test continuity on a channel of a packet network, the method comprising:

receiving a continuity test instruction;

processing the continuity test instruction to generate a request for continuity acknowledgment message;

transmitting the request for continuity acknowledgment message over the channel of the packet network;

generating a continuity confirmation message identifying continuity on the channel of the packet network if a continuity acknowledgment message is received over the channel of the packet network in response to the request for continuity acknowledgment message; and transmitting the continuity confirmation message.

11. The method of claim 10 further comprising:

generating an error message if the continuity acknowledgment message is not received; and transmitting the error message.

12. The method of claim 10 further comprising:
receiving the continuity acknowledgment message;
processing the continuity acknowledgment message to generate call tones; and
transmitting the call tones.

13. The method of claim 10 further comprising:
processing another request for continuity acknowledgment message to generate another continuity acknowledgment message; and
transmitting the other continuity acknowledgment message over the packet network.

14. The method of claim 10 further comprising:
processing a continuity test tones instruction to generate continuity test tones; and
transmitting the continuity test tones over a bearer channel of a communication network.

15. The method of claim 14 further comprising:
receiving the continuity test tones over the bearer channel of the communication network;
responsive to receiving the continuity test tones, generating a continuity test tone confirmation message; and
transmitting the continuity test tone confirmation message.

16. The method of claim 10 wherein the communication hub is a switch.

17. The method of claim 10 wherein the communication hub is a residential communication hub.

18. The method of claim 10 wherein the communication hub is a voice gateway.

19. A communication system for testing continuity on a channel of a packet network, the communication system comprising:
a first communication hub connected to the packet network; and
a second communication hub connected to the packet network;
wherein the packet network is configured to provide a continuity test instruction to the second communication hub;
wherein the second communication hub is configured to process the continuity test instruction to generate a request for continuity acknowledgment message, provide the request for continuity acknowledgment message to the first communication hub over the channel of the packet network;
wherein the first communication hub is configured to process the request for continuity acknowledgement message and provide a continuity acknowledgement message over the channel of the packet network to the second communication hub.

20. The communication system of claim 19 wherein the second communication hub is further configured to process the continuity acknowledgment message to provide a continuity confirmation message identifying continuity on the channel of the packet network.

21. The communication system of claim 19 wherein the second communication hub is further configured to process the continuity acknowledgment message to generate call tones for a call device.

22. The communication system of claim 19 wherein the second communication hub is further configured to process a continuity test tone instruction to generate continuity test tones and provide the continuity test tones over a bearer channel of a communication network.

23. The communication system of claim 22 wherein the second communication hub is further configured to receive the continuity test tones over the bearer channel of the communication network and process the continuity test tones to provide a continuity test tone confirmation message.

24. The communication system of claim 19 wherein at least one of the first communication hub and the second communication hub is a switch.

25. The communication system of claim 19 wherein at least one of the first communication hub and the second communication hub is a residential communication hub.

26. The communication system of claim 19 wherein at least one of the first communication hub and the second communication hub is a voice gateway.

27. The communication system of claim 19 wherein the first communication hub is configured to communicate with the second communication hub over the packet network using an address for the packet network.

28. A method of operating a communication system to test continuity on a channel of a packet network, wherein the communication system comprises a first communication hub and a second communication hub, the method comprising:
receiving a continuity test instruction in the second communication hub;
processing the continuity test instruction in the second communication hub to provide a request for continuity acknowledgment message to the first communication hub over the channel of the packet network; and
processing the request for continuity acknowledgment message in the first communication hub to provide a continuity acknowledgment message to the second communication hub over the channel of the packet network.

29. The method of claim 28 further comprising:
processing the continuity acknowledgment message in the second communication hub to provide a continuity confirmation message identifying continuity on the channel of the packet network.

30. The method of claim 28 further comprising:
processing the continuity acknowledgment message in the second communication hub to generate call tones for a call device.

31. The method of claim 28 further comprising:
processing a continuity test tone instruction in the second communication hub to generate continuity test tones; and
transmitting the continuity test tones over a bearer channel of a communication network.

32. The method of claim 31 further comprising:
receiving the continuity test tones in the second communication hub over the bearer channel of the communication network; and
processing the continuity test tones to provide a continuity test tone confirmation message.

33. The method of claim 28 wherein at least one of the first communication hub and the second communication hub is a switch.

34. The method of claim 28 wherein at least one of the first communication hub and the second communication hub is a residential communication hub.

35. The method of claim 28 wherein at least one of the first communication hub and the second communication hub is a voice gateway.

36. The method of claim 28 further comprising:
transmitting messages between the first communication hub and the second communication hub over the packet network using an address for the packet network.

* * * * *